Figures 1, 2:
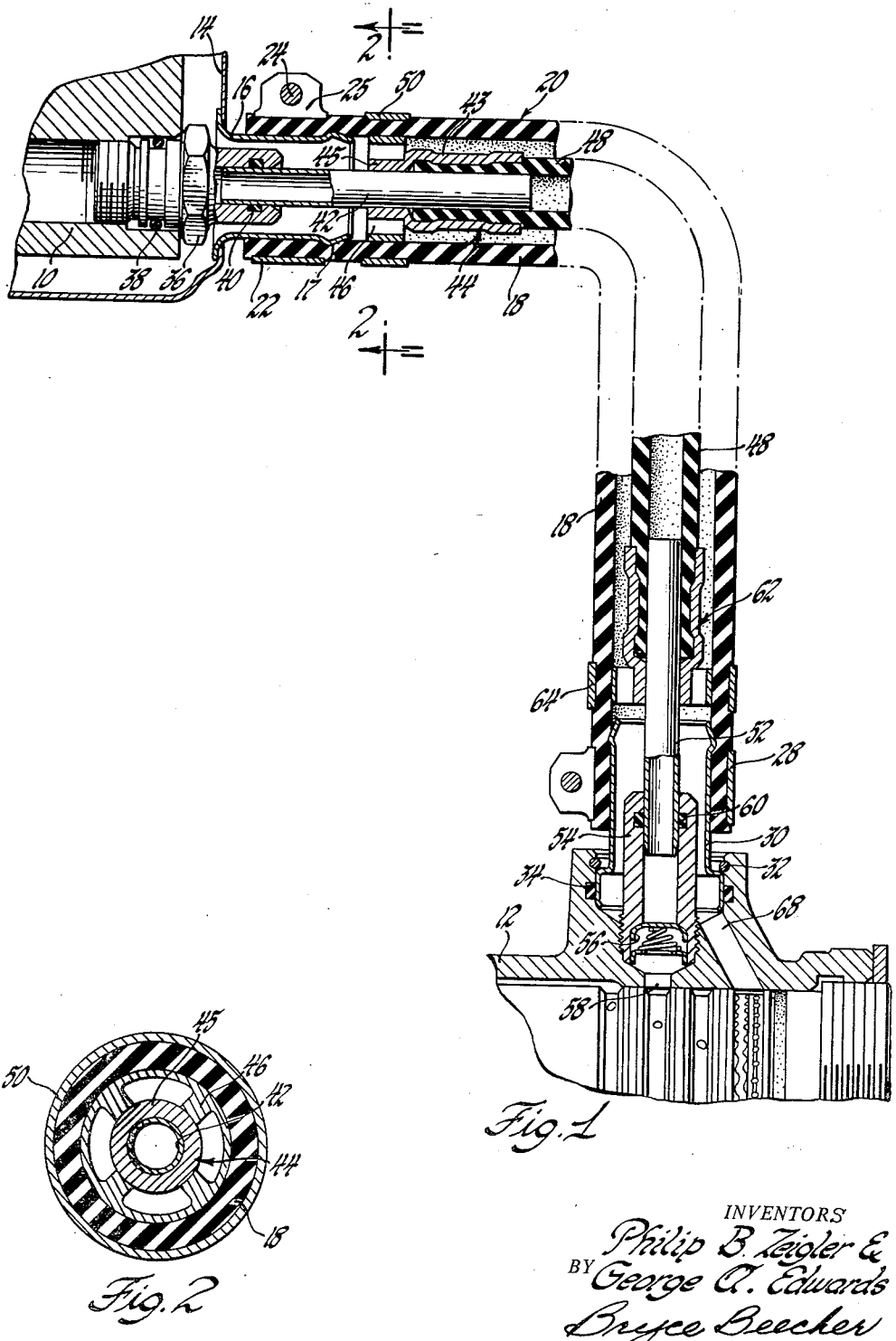

Oct. 18, 1960 P. B. ZEIGLER ET AL 2,956,586
HOSE ARRANGEMENT
Filed Sept. 3, 1959

INVENTORS
Philip B. Zeigler &
BY George A. Edwards
Bryce Beecher
ATTORNEY

United States Patent Office 2,956,586
Patented Oct. 18, 1960

2,956,586

HOSE ARRANGEMENT

Philip B. Zeigler and George A. Edwards, Saginaw, Mich., assignors to General Motors Corporation, Detroit, Mich., a corporation of Delaware Filed Sept. 3, 1959, Ser. No. 837,984

3 Claims. (Cl. 137—563)

This invention relates to fluid systems and more especially concerns improved means for conveying discharge fluid from and returning exhaust fluid to a pressure source. The invention has been found to possess particular utility in hydraulic power steering and will be particularly described in that connection.

The conventional hydraulic power steering gear comprises a pump powered by the vehicle engine, a reservoir from which the pump draws and within which the pump is commonly located, an hydraulic ram operably connected to a steering member and a valve for controlling flow between the pump and ram. Such valve is so designed that in its centered position corresponding to the straight-ahead position of the dirigible wheels the working fluid supplied by the pump flows therethrough and back to the reservoir against the static pressure of the fluid in the ram.

Heretofore, two separate hose assemblies have been used between the pump-reservoir assemblage and the valve, one conveying pressure fluid to the valve, the other serving to convey return fluid from the valve to the reservoir. These hoses, which must by necessity be located in the engine compartment of the vehicle, the pump being belt driven by the crankshaft of the engine, are not only unesthetic, but present a considerable nuisance to mechanics in service garages since the hoses must frequently be disconnected to permit work on the engine.

Another problem which for some time has occupied the attention of design engineers working in the power steering field is the hissing noise produced by the turbulence induced in the working fluid as it flows through the control valve when the same is on center or nearly so. This noise, occasioned by the narrowness of the valve gaps, is particularly noticeable at low engine speeds when it is not masked by engine noise, and is disturbing to many vehicle operators despite assurances by service people that it is "normal."

The invention herein aims to provide a hose assembly for the purpose indicated, which combines the pressure and return conduits and which requires only two, as opposed to four, points of connection within the engine.

A further object is to provide such an assembly which in use operates to attenuate the hissing noise above-mentioned.

In the accompanying drawings illustrating a preferred embodiment of the invention:

Figure 1 is a view showing the hose assembly as installed, the same appearing in broken longitudinal section; and Figure 2 is a section on the line 2—2 in Figure 1.

Referring first to Figure 1, the numeral 10 denotes the body of the pump which supplies pressure fluid to the valve 12, the pump being positioned within the reservoir 14 from which it draws. The reservoir 14 has secured thereto, as by brazing or welding, a boss element 16 for the outer component 18 of the hose assembly, generally denoted by the numeral 20. A ring clamp 22 of conventional design secures the end of the hose 18 to the boss element, which will be noted as distorted at 17 to provide an annular shoulder against which the material of the hose is compressed. Tightening of the ring clamp 22 is effected by turning the screw 24, which operates to draw the clamp ends, only one of which (25) is shown, together. A similar clamp 28 is employed at the opposite end of hose 18 to fasten such end to a boss element 30 which is secured to the housing of the valve 12 by a snap ring 32. Below the snap ring, the boss element 30 is surrounded by a seal 34 disposed in an annular recess formed in the valve housing.

A boss member 36 threaded into the body of the pump 10, and annularly recessed for the accommodation of seals 38 and 40, has extending thereinto a rigid tubular element 42 constituting a part of the hose assembly. Such element is held in concentric relation to the hose 18 by means of a support 44. This support comprises a body portion 45 directly engaging the tubular element 42 and having an extension 43 whereby the pump end of the inner hose component 48 of the hose assembly is crimped to the tubular element. The support further comprises a spoked portion 46 (Fig. 2) fixed as by welding to the body portion 45. Support 44 is secured in place by a crimp ring 50 applied about the outer hose 18.

At the opposite end of the hose assembly there will be seen a second rigid tubular element 52 forming part of the hose assembly and in all respects identical to element 42. The outer end of the element 52 will be seen accommodated in a boss member 54 threaded into the housing of the valve 12, such boss member being internally formed at its end within the valve housing to seat a check valve 56 which prevents back-flow from the valve pressure port 58. A seal 60 carried by the boss member 64 in encircling relation to the tubular element 52 serves an obvious purpose.

Tubular element 52 is surrounded within the outer hose 18 by a support 62 similar to the previously described support 44. Thus, the support 62 serves to crimpingly secure the valve end of the hose 48 to the tubular element 52 and is itself secured against displacement by a crimp ring 64 encircling hose 18.

As should by now be apparent, the inner hose 48 serves to convey the pressure fluid from the pump 10 to the valve 12, while the outer hose 18 serves in the conveyance of the return or exhaust fluid to the reservoir 14, this return fluid being derived from a passage 68, not hereinbefore identified, extending from an exhaust chamber in the valve.

With the arrangement as described and illustrated, it should be clear that to completely disconnect the hose assembly from the reservoir and valve, it is only necessary to loosen the two clamps 22 and 28, an operation accomplished in a matter of seconds. And it should be equally evident that re-installation of the hose can be achieved in a substantially equal short time.

As indicated in the forepart hereof, the hose assembly herein markedly reduces the hissing noise resulting from turbulent fluid flow within the control valve when the same is in its position whereat the valving edges are in close juxtaposition. In explanation, it appears that such flow within the valve induces a more or less pulsating flow within the hose 18 and that this pulsating flow is damped by the pressure hose 48 with the creation in hose 18 of a fluctuating back pressure operating to lessen the turbulence.

We claim:

1. In a fluid system incorporating a pump encased in a reservoir from which the pump draws and further incorporating a valve controlling the flow of discharge fluid from the pump and the flow of return fluid to the reservoir, means for conveying the discharge fluid from the pump to the valve and for conveying the return fluid from the valve to the reservoir, said means comprising a pair of concentric hoses and boss means at either end of either hose whereby the hose assembly is connected to the pump-reservoir assembly and the valve, the inner hose having a rigid tubular member fitted at either end thereof, such members being supported within the outer hose by means crimpingly engaging the ends of said inner component to secure the same to the tubular members and being secured in place by crimp means encircling said outer hose.

2. In a fluid system incorporating a pump encased in a reservoir from which the pump draws and further incorporating a valve controlling the flow of discharge fluid from the pump and the flow of return fluid to the reservoir, a hose assembly comprising an inner component for conveying the discharge fluid to the valve, an outer component concentric with said inner component for conveying the return fluid from the valve to the reservoir, boss means associated with said reservoir and valve to which the ends of said outer component are clampingly secured, an elongated rigid tubular member fitted end-wise into said inner component at either end thereof, second boss means associated with said pump and valve in concentric relation to said first boss means, said second boss means accommodating the outer ends of said tubular members, and support means for said tubular members located within said outer component outward of said boss means, said support means crimpingly engaging the ends of said inner component to secure the same to said tubular members and being secured in place by crimp means encircling said outer component.

3. In a fluid system incorporating a pump encased in a reservoir from which the pump draws and further incorporating a valve controlling the flow of discharge fluid from the pump and the flow of return fluid to the reservoir, a hose assembly comprising an inner component for conveying the discharge fluid to the valve, an outer component concentric with said inner component for conveying the return fluid from the valve to the reservoir, boss means associated with said reservoir and valve to which the ends of said outer component are clampingly secured, an elongated rigid tubular member fitted end-wise into said inner component at either end thereof, second boss means associated with said pump and valve in concentric relation to said first boss means, said second boss means accommodating the outer ends of said tubular members, and support means for said tubular members located within said outer component outward of said boss means, each said support means crimpingly engaging the corresponding end of said inner component and being crimped to said outer component by means encircling said outer component.

No references cited.